Jan. 3, 1967  J. O. LUTZ  3,295,857

PISTON RING ASSEMBLY

Filed July 29, 1963

INVENTOR.
JOHN O. LUTZ
BY
Arthur H. Seidel
ATTORNEY.

United States Patent Office 3,295,857
Patented Jan. 3, 1967

3,295,857
PISTON RING ASSEMBLY
John O. Lutz, St. Paul, Minn., assignor to Wilkening Manufacturing Co., Philadelphia, Pa., a corporation of Pennsylvania
Filed July 29, 1963, Ser. No. 298,207
7 Claims. (Cl. 277—141)

This invention relates to a piston ring assembly structurally interrelated in a manner to substantially reduce "blow by."

The terminology "blow by" refers to escape of gases between the cylinder wall and the piston. The "blow by" problem has become accentuated in recent years due to the higher and higher compression ratios of internal combustion engines. It has been reported that such gases, which have escaped, added to the smog problem in large cities. In order to alleviate this problem, the piston ring assembly of the present invention is structurally interrelated in a manner wherein two ring members are in a random or particular orientated rotative disposition.

In the piston ring assembly of the present invention, there are provided first and second split ring members in overlying disposition. Each ring member may be provided with a recess on its inner periphery when particular orientation is desired. The distance between the split on the first ring member and the recess on the first ring member is greater than the corresponding distance on the second ring member. An expander or other internal spring design may be provided within the ring members to apply a radially outwardly biasing force on the ring members. The expander may have a portion disposed within the recess on each ring member thereby retaining the ring members in a predetermined rotative disposition.

It is an object of the present invention to provide a novel piston ring assembly.

It is another object of the present invention to provide a piston ring assembly which is more efficient than those proposed heretofore.

It is another object of the present invention to provide a piston ring assembly which is more effective in controlling or eliminating "blow by."

Other objects will appear hereinafter.

For the purpose of illustrating the invention there is shown in the drawings a form which is presently preferred; it being understood, however, that this invention is not limited to the precise arrangements and instrumentalities shown.

Figure 1:
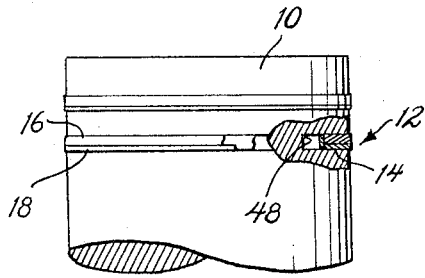
FIGURE 1 is a partial side elevation view of a piston, partially broken away to illustrate the assembled disposition of the piston ring assembly of the present invention.

Referring to the drawing in detail, wherein like numerals indicate like elements, there is shown in FIGURE 1 a piston 10 having a plurality of grooves 14 on its outer peripheral surface. Within one of the compression ring grooves and preferably the lowermost such groove, there is disposed piston ring assembly 12. The details of the piston ring assembly 12 are set forth in greater detail in FIGURES 3-6. The assemblies in the remaining grooves may be conventional.

The piston ring assembly 12 includes a first ring member 16 and a second ring member 18. The ring members 16 and 18 are split and disposed in overlying relationship. Ring member 16 may be provided with a beveled outer peripheral face so that the inner diameter of the upper surface is less than the outer diameter of the bottom surface which is juxtaposed to the ring member 18.

The ring member 16 is substantially thicker than the ring member 18. Ring member 16 is preferably made from cast iron. Ring member 18 is preferably a steel rail having a rounded outer peripheral surface 22 which is preferably chrome-plated at 23 for longer life. The ring member 16 has a split or gap 26 defined by juxtaposed ends as illustrated more clearly in FIGURE 3.

Within the ring members 16 and 18, there is provided an expander which is an independent element designed to maintain constant and uniform tension between the ring members and the cylinder wall. If desired, the ring members may be self tensioning. The expander 24 is provided with an axially directed undulating outer periphery defined by projections 28 and valleys 29. Expander 24 may be made from spring steel or the like. The height of the expander 24 is slightly greater than the combined thickness of the ring members 16 and 18 as illustrated more clearly in FIGURE 4.

Figure 3:
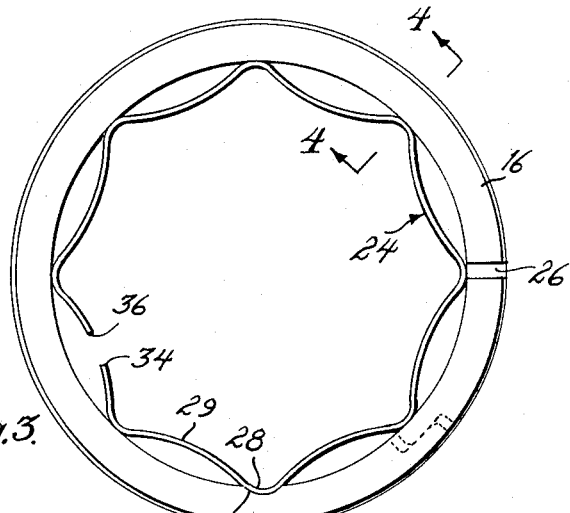
FIGURE 3 is a top plan view taken along the line 3—3 in FIGURE 2.
Figure 2:
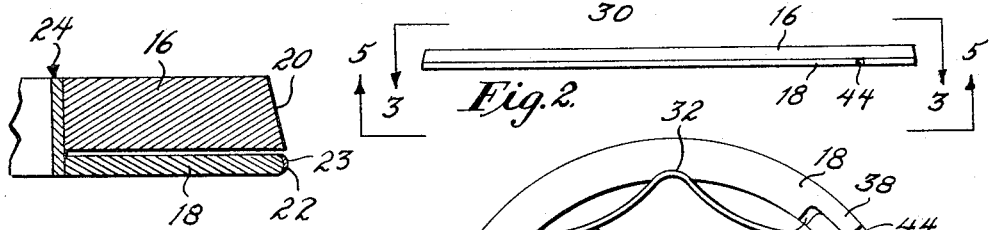
FIGURE 2 is a side elevation view of the piston ring assembly of the present invention.
Figure 4:
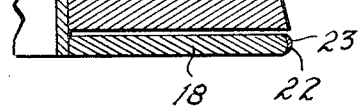
FIGURE 4 is an enlarged detail view taken along lines 4—4 in FIGURE 3.
Figure 5:
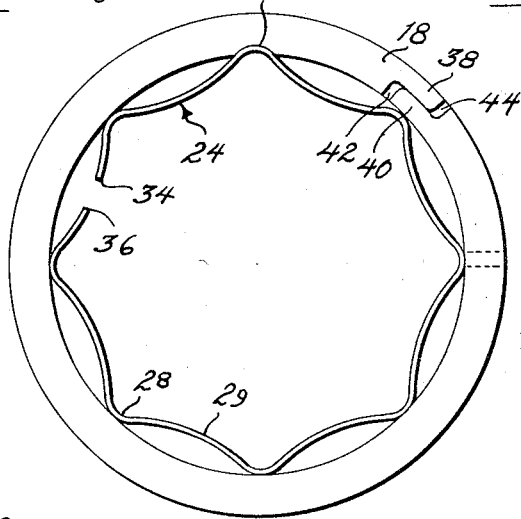
FIGURE 5 is a bottom plan view taken along line 5—5 of FIGURE 2.
Figure 6:
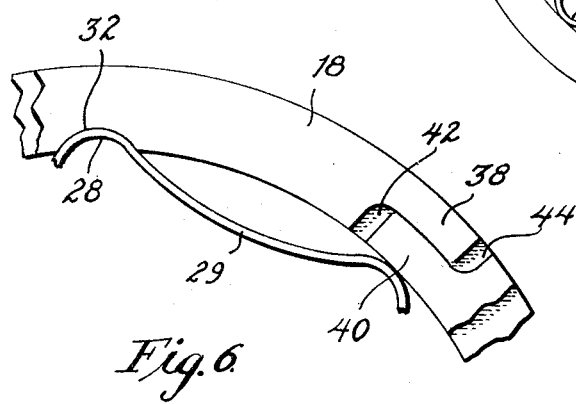
FIGURE 6 is an enlarged detailed view of the upper right quadrant of the assembly illustrated in FIGURE 5.

As shown more clearly in FIGURE 3, the ring member 16 is provided with a recess 30 on its inner periphery ninety arcuate degrees from the gap 26. As shown more clearly in FIGURE 5, ring member 18 is provided with a recess 32 on its inner periphery approximately forty-five arcuate degrees from the split on ring member 18. As will be made clear hereinafter, one of the projections on the expander 24 extends into the recesses 30 and 32 to maintain the splits or gaps in the ring members in a predetermined rotative disposition.

The expander 24 is provided with a gap defined by the free ends 34 and 36. The gap in the expander 24 is preferably positioned so as to be remote from the gap 26 and the gaps formed by the rabbeted joint on the ring member 18. The rabbeted joint is formed by the overlapping projections 38 and 40 having juxtaposed surfaces along an arc of a circle intermediate and preferably equidistant from the inner and outer peripheries of the ring member 18. It will be noted that the rabbeted joint on the ring member 18 results in the provision of gaps 42 and 44 on the inner and outer periphery, respectively. I have found that the provision of different types of joints for the ring members in combination with means to maintain a predetermined rotative disposition of the ring members is effective in controlling "blow by."

When the assembly 12 is disposed within groove 14, the valleys 29 engage the bottom wall 48 of groove 14.

The present invention may be embodied in other specific forms without departing from the spirit or essential attributes thereof and, accordingly, reference should be made to the appended claims, rather than to the foregoing specification as indicating the scope of the invention.

I claim:
1. A piston ring assembly comprising first and second split ring members in overlying disposition, each ring member having a recess on its inner periphery, said recesses extending through said rings, said rings being positioned so that said recesses are aligned, the distance from the recess on the first ring member to the split on the first ring member being greater than the corresponding distance on the second ring member, an expander within said ring members biasing said ring members radially outwardly, said expander having an undulating periphery of projections and valleys, said expander having a portion disposed within said recesses thereby retaining a predetermined relative rotative disposition between the splits on said ring members, said portion of said expander being a projection, the other of said projections of said expander being in contact with the inner periphery of said ring members wherein the height of said entire expander is greater than the combined thickness of the first and second piston rings.

2. A piston ring assembly in accordance with claim 1 wherein the split on the second ring member is a rabbeted joint with arcuate juxtaposed surfaces intermediate the inner and outer periphery of said second ring member.

3. A piston ring assembly in accordance with claim 2 wherein the split on said first member is a butt joint defined by juxtaposed parallel surfaces.

4. A piston ring assembly in accordance with claim 1 wherein one of said ring members is substantially thinner than the other ring member.

5. A piston ring assembly in accordance with claim 1 wherein said second ring member being made from steel, and said second ring member being below said first ring member.

6. A piston ring assembly in accordance with claim 4 wherein said other ring member is made from cast iron having a beveled surface on its outer periphery so that the diameter of the other ring member at its upper surface being less than the diameter at its lowermost surface.

7. A piston ring assembly in accordance with claim 1 including a piston having a plurality of peripheral grooves, said piston ring assembly being at least partially disposed within one of said grooves, and the valleys on said expander being in contact with the bottom of said one groove.

References Cited by the Examiner

UNITED STATES PATENTS

| 1,280,493 | 10/1918 | Kurtz | 277—198 |
| 1,739,841 | 12/1929 | Kinsel | 277—156 X |
| 2,117,986 | 5/1938 | Robertson | 277—160 |
| 2,128,372 | 8/1938 | Marien | 277—161 |
| 2,580,124 | 12/1951 | Phillips | 277—162 |
| 2,670,255 | 2/1954 | Bergeron | 277—193 |

FOREIGN PATENTS

| 877,436 | 9/1942 | France. |
| 448,309 | 8/1927 | Germany. |

OTHER REFERENCES

Power: July 1952, vol. 96, issue No. 7, pages 107 and 108.

LAVERNE D. GEIGER, *Primary Examiner.*

S. ROTHBERG, L. J. RANEY, J. S. MEDNICK,
*Assistant Examiners.*